(12) United States Patent
Fang

(10) Patent No.: US 9,787,357 B2
(45) Date of Patent: *Oct. 10, 2017

(54) FAR-END CROSSTALK CANCELING METHOD AND DEVICE

(71) Applicant: Huawei Technologies Co., Ltd., Shenzhen (CN)

(72) Inventor: Liming Fang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,745

(22) Filed: Jun. 9, 2015

(65) Prior Publication Data

US 2015/0270871 A1    Sep. 24, 2015

Related U.S. Application Data

(63) Continuation of application No. 14/311,868, filed on Jun. 23, 2014, now Pat. No. 9,071,334, which is a
(Continued)

(30) Foreign Application Priority Data

Dec. 7, 2006    (CN) .......................... 2006 1 0162179

(51) Int. Cl.
*H04B 3/32*    (2006.01)
*H04B 15/00*    (2006.01)
(Continued)

(52) U.S. Cl.
CPC ................ *H04B 3/32* (2013.01); *H04B 1/62* (2013.01); *H04J 1/12* (2013.01); *H04L 2012/6478* (2013.01)

(58) Field of Classification Search
CPC .............. H04B 3/32; H04B 3/487; H04J 1/12
(Continued)

(56) References Cited

U.S. PATENT DOCUMENTS 5,892,464 A    4/1999    St. John et al.
6,434,110 B1    8/2002    Hemkumar
(Continued)

FOREIGN PATENT DOCUMENTS

CN    1386323 A    12/2002
CN    1395779 A    2/2003
(Continued)

OTHER PUBLICATIONS

Li et al., "Noise Reduction Using a Variable Step Size Adaptive Filter," Optoelectronic Technology & Information, vol. 17, No. 5, 3 pages total, Institute of Electrical and Electronics Engineers, New York, New York (Oct. 2004).
(Continued)

*Primary Examiner* — Betsy Deppe
(74) *Attorney, Agent, or Firm* — Leydig, Voit & Mayer, Ltd.

(57) ABSTRACT

A method for reducing far-end crosstalk in a digital line system is provided. The method includes receiving a noise related value fed back from a first receiving end to a first transmitting end over a first line. The method further includes pre-coding, a first signal and crosstalk source signals according to values of filtering parameters to form a synthesized signal corresponding to the first line. The crosstalk source signals are related to second signals over a second line. The method further includes transmitting the synthesized signal from the first transmitting end to the first receiving end over the first line. A corresponding device for reducing far-end crosstalk in a digital line system is provided.

14 Claims, 9 Drawing Sheets

Related U.S. Application Data continuation of application No. 13/612,222, filed on Sep. 12, 2012, now Pat. No. 8,792,568, which is a continuation of application No. 13/271,903, filed on Oct. 12, 2011, now Pat. No. 8,295,369, which is a continuation of application No. 12/478,962, filed on Jun. 5, 2009, now Pat. No. 8,254,471, which is a continuation of application No. PCT/CN2007/071204, filed on Dec. 7, 2007.

(51) Int. Cl.
*H04J 1/12* (2006.01)
*H04L 27/28* (2006.01)
*H04B 1/62* (2006.01)
*H04L 12/64* (2006.01)

(58) Field of Classification Search
USPC ....... 375/219, 227, 257, 285, 316, 232, 259, 375/260; 370/201; 379/93.01
See application file for complete search history.

(56) References Cited

U.S. PATENT DOCUMENTS

| | | | |
|---|---|---|---|
| 7,689,637 B1 | 3/2010 | Gornstein et al. | |
| 8,254,471 B2 * | 8/2012 | Fang | H04B 3/32 370/201 |
| 8,295,369 B2 * | 10/2012 | Fang | H04B 3/32 370/201 |
| 8,792,568 B2 * | 7/2014 | Fang | H04B 3/32 370/201 |
| 2002/0041678 A1 | 4/2002 | Basburg-Ertem et al. | |
| 2003/0003880 A1 | 1/2003 | Ling et al. | |
| 2003/0137925 A1 | 7/2003 | Zamir | |
| 2003/0235201 A1 | 12/2003 | Kasper et al. | |
| 2004/0071284 A1 | 4/2004 | Abutalebi et al. | |
| 2004/0086064 A1 | 5/2004 | Van Acker et al. | |
| 2004/0090927 A1 | 5/2004 | Zimmerman et al. | |
| 2004/0114678 A1 | 6/2004 | Langberg et al. | |
| 2004/0170230 A1 | 9/2004 | Zimmerman et al. | |
| 2005/0013353 A1 | 1/2005 | Alloin | |
| 2005/0052988 A1 | 3/2005 | Tsatsanis et al. | |
| 2005/0074055 A1 | 4/2005 | Takatori et al. | |
| 2005/0094583 A1 | 5/2005 | Gupta et al. | |
| 2005/0099967 A1 | 5/2005 | Baba | |
| 2005/0186933 A1 | 8/2005 | Trans | |
| 2006/0029147 A1 | 2/2006 | Tsatsanis | |
| 2006/0034162 A1 | 2/2006 | Jones et al. | |
| 2006/0078065 A1 | 4/2006 | Cai et al. | |
| 2006/0274824 A1 | 12/2006 | Kroninger et al. | |
| 2007/0014378 A1 | 1/2007 | Parhi et al. | |
| 2007/0273585 A1 | 11/2007 | Sarroukh et al. | |
| 2008/0068978 A1 | 3/2008 | Clausen | |
| 2008/0188185 A1 | 8/2008 | Shi | |
| 2009/0116639 A1 | 5/2009 | Zimmerman et al. | |

FOREIGN PATENT DOCUMENTS

| | | |
|---|---|---|
| CN | 1499734 A | 5/2004 |
| CN | 1552132 A | 12/2004 |
| CN | 1689072 A | 10/2005 |
| CN | 1838578 A | 9/2006 |
| CN | 1863099 A | 11/2006 |
| CN | 1866938 A | 11/2006 |
| CN | 1870458 A | 11/2006 |
| CN | 101197593 B | 11/2011 |
| CN | 101197798 B | 11/2011 |
| EP | 2091193 A1 | 8/2009 |
| EP | 2093896 A1 | 8/2009 |
| WO | WO 0184708 A2 | 11/2001 |
| WO | WO 02078211 A2 | 10/2002 |
| WO | WO 03017534 A2 | 2/2003 |
| WO | WO 2004017303 A1 | 2/2004 |
| WO | WO 2004105287 A2 | 12/2004 |
| WO | WO 2005076554 A1 | 8/2005 |
| WO | WO 2005106841 A1 | 11/2005 |

OTHER PUBLICATIONS

Office Action of corresponding U.S. Appl. No. 12/479,979, 18 pages total (dated Nov. 25, 2011).
U.S. Appl. No. 13/271,903.
U.S. Appl. No. 12/481,307.
U.S. Appl. No. 12/479,979.
Gilloire, A., et al., "Adaptive Filtering in Subbands with Critical Sampling: Analysis, Experiments, and Application to Acoustic Echo Cancellation," IEEE Transaction of Signal Processing, Institute of Electrical and Electronics Engineers, New York, New York (Aug. 1992).
Information Disclosure Statement from related U.S. Appl. No. 12/479,979 (dated Jun. 8, 2009).
Information Disclosure Statement from related U.S. Appl. No. 12/481,307 (dated Jun. 9, 2009).
"G.vdsl2: Method of Downstream FEXT cancellation," COM 15-C 269-E, International Telecommunication Union-Telecommunication Standardization Sector, Geneva, Switzerland (Oct. 2006).
"G.vds12: Pilot sequence assisted vector channel estimation," COM 15-C 177-E, International Telecommunication Union-Telecommunication Standardization Sector, Geneva, Switzerland (Oct. 2006).
"G.vdsl: Proposed Requirements on Back Channel for Estimating MIMO Channel in VDSL2," International Telecommunication Union-Telecommunication Standardization Sector, Geneva, Switzerland (Sep. 25-29, 2006).
"G.vdsl: Requirements for Enabling FEXT Cancellation," International Telecommunication Union-Telecommunication Standardization Sector, Geneva, Switzerland (Apr. 24-28, 2006).
$1^{st}$ Office Action in corresponding U.S. Appl. No. 12/478,962 (dated Dec. 9, 2011).
$1^{st}$ Office Action in corresponding U.S. Appl. No. 13/271,903 (dated Dec. 15, 2011).
$2^{nd}$ Office Action in corresponding U.S. Appl. No. 13/271,903 (dated May 16, 2012).
U.S. Appl. No. 12/478,962.
$1^{st}$ Office Action in corresponding U.S. Appl. No. 12/481,307 (dated May 16, 2013).
Final Office Action in corresponding U.S. Appl. No. 12/481,307 (dated Aug. 16, 2013).
$1^{st}$ Office Action in corresponding U.S. Appl. No. 13/612,222 (dated Feb. 22, 2013).
"Series G: Transmission Systems and Media, Digital Systems and Networks; Digital sections and digital line system—Access networks: Very high speed digital subscriber line transceivers 2 (VDSL2)," ITU-T Recommendation G993.2, pp. 1-241, International Telecommunication Union-Telecommunication Standardization Sector, Geneva, Switzerland (Feb. 2006).

* cited by examiner

FAR-END CROSSTALK CANCELING METHOD AND DEVICE

CROSS-REFERENCE TO RELATED APPLICATIONS

This application is a continuation of U.S. patent application Ser. No. 14/311,868, filed on Jun. 23, 2014 now issued as U.S. Pat. No. 9,071,334, which is a continuation of U.S. patent application Ser. No. 13/612,222, filed on Sep. 12, 2012 now issued as U.S. Pat. No. 8,792,568. U.S. patent application Ser. No. 13/612,222 is a continuation of U.S. patent application Ser. No. 13/271,903, filed on Oct. 12, 2011 now issued as U.S. Pat. No. 8,295,369, which is a continuation of U.S. patent application Ser. No. 12/478,962, filed on Jun. 5, 2009 now issued as U.S. Pat. No. 8,254,471. U.S. patent application Ser. No. 12/478,962 is a continuation of International Patent Application No. PCT/CN2007/071204, filed on Dec. 7, 2007. The International Patent Application claims priority to Chinese Patent Application No. 200610162179.6, filed on Dec. 7, 2006. The aforementioned patent applications are hereby incorporated by reference in their entireties.

FIELD OF THE INVENTION

The present invention relates to the technical field of transmission and processing technologies of digital signals, and in particular to a far-end crosstalk canceling method and device.

BACKGROUND OF THE INVENTION

Digital Subscriber Lines (DSL) is point-to-point transmission technologies over a transmission medium of twisted pairs. The DSL provides an efficient and economic access to a broadband network. The DSL are also commonly referred to as xDSL, where "x" representing diffident kinds of digital subscriber line technologies. The xDSL generally includes Integrated Services Digital Network Digital Subscriber Lines (IDSL, ISDN DSL), Asymmetric Digital Subscriber Lines (ADSL), High-bit-rate Digital Subscriber Lines (HDSL), Very high data rate Digital Subscriber Lines (VDSL), etc. The various digital subscriber lines technologies are different from each other mainly in terms of signal transmission rate and distance. Except for the baseband transmission based IDSL, the xDSL generally coexists with the Plain Old Telephone Service (POTS) on the same twisted pair, where the POTS occupies the baseband part and the xDSL occupies the high frequency band for transmission independent of each other.

With the development of applications, requirements for the xDSL bandwidth become increasingly strict and the frequency band used for the xDSL also becomes higher accordingly, so that the crosstalk, especially the crosstalk at the high frequency band, becomes increasingly exacerbated. In the xDSL, a Digital Subscriber Line Access Multiplexer (DSLAM) is usually used to provide an access service for multiple branches of xDSL signals. Because the xDSL adopts frequency division multiplexing for uplink and downlink channels, a near-end crosstalk may not endanger considerably the system performance. However, a far-end crosstalk may influence seriously the transmission performance of lines. When an xDSL service is required to be enabled for multiple branches of users over a bundle of cables, some lines may have a low speed, unstable performance and even may be unable to function due to the far-end crosstalk, which may eventually result in a low line activation ratio of the DSLAM.

FIG. 1 illustrates a schematic diagram of a far-end crosstalk, where x1, x2 and x3 denote signal transmitting points, y1, y2 and y3 denote corresponding far-end signal receiving points, solid line arrows denote normal signal transmission, and dotted line arrows denote a crosstalk caused by a signal transmitting points to far-end receiving points corresponding to other signal transmitting points. As can be seen from FIG. 1, signals to be transmitted at the points x2 and x3 are crosstalk sources for those at the point x1, and naturally, signals to be transmitted at the point x1 are crosstalk sources for those at the points x2 and x3. Therefore, for clarity, a branch of signals to be transmitted is described as a reference object while regarding other signals as their crosstalk sources hereinafter. Such descriptions can be adaptive to respective branches of signals. Distinguishing names used for signals are merely for convenience, but not intended to differentiate the signals substantively.

In order to address the problem of the degraded channel performance due to the far-end crosstalk, a method of coordinated signal processing was proposed in the industry to cancel a far-end crosstalk among respective branches of signals by use of the feature of coordinated transmission and reception at the DSLAM end. At present, the signals are processed with a fixed filter in the frequency domain based upon such a principle that crosstalk cancellation calculations are performed on the premise that a channel transmission matrix has been pre-known. For coordinated reception of signals, this method frequency domain filters respective frequency points of received signals according to the pre-known channel transmission matrix, and then estimates input channel signals in a general decision feedback equalization method. The essence of the method lies in that: because the channel transmission matrix is known, the relationship between crosstalk components in the received signals and a crosstalk source may be deduced, so that received signals corresponding to the crosstalk source can be used to approximately simulate the crosstalk source, thereby implementing a crosstalk cancellation at the coordinated receiving end. On the other hand, for coordinated transmission of signals, the method is similar to that for coordinated reception except that the signals are pre-coded in the frequency domain before transmission instead of processing the signals undergoing a crosstalk, to pre-cancel a crosstalk which may occur. Therefore, the receiving end receives the signals from which the crosstalk has been canceled.

The above method has a disadvantage in that the channel transmission matrix has to be pre-known, but the matrix may be difficult to be obtained accurately and conveniently. In addition, the matrix per se features slowly time-varying and may be susceptible to a transmission environmental factor. Consequently, the above solution may be difficult to implement in practice.

SUMMARY OF THE INVENTION

Embodiments of the present invention are directed to providing a far-end crosstalk canceling method and a far-end crosstalk canceling device, so as to solve the problem of canceling far-end crosstalk for coordinated transmitting signals.

In order to solve the above technical problem, an embodiment of the present invention provides a far-end crosstalk method for reducing far-end crosstalk including: synthesizing, at the first transmitting end, a first signal to be transmitted over the first line with filtered crosstalk source signals which is acquired by filtering crosstalk source signals according to values of filtering parameters, wherein the crosstalk source signals are related to signals to be transmitted over second lines, each of the second lines having a second transmitting end connected to a second receiving end;

transmitting the synthesized first signal from the first transmitting end to the first receiving end over the first line;

receiving, at the first transmitting end, a noise statistic related value fed back from the first receiving end, wherein the noise statistic related value reflects a noise component of the synthesized first signal received at the first receiving end; and adjusting, at the first transmitting end, the values of the filtering parameters according to the noise statistic related value, wherein the adjusted values of the filtering parameters are used in filtering the crosstalk source signals.

An embodiment of the present invention further provides a device for reducing far-end crosstalk in signal transmission lines, which is implemented in a first transmitting end connected to a first receiving end over a first line, including:

an adaptive filter,
a signal synthesis module,
a signal transmitting module, and
a feedback receiving module, wherein the adaptive filter is configured to filter a crosstalk source signal according to a value of a filtering parameter, wherein the crosstalk source signal is related to signals to be transmitted over second lines, each of the second lines having a second transmitting end connected to a second receiving end;

the signal synthesis module is configured to synthesize a first signal to be transmitted over the first line with the filtered crosstalk source signals;

the signal transmitting module is configured to transmit the synthesized first signal to the first receiving end; and the feedback receiving module is configured to receive a noise statistic related value fed back from the first receiving end, wherein the noise statistic related value reflects a noise component of the synthesized first signal received by the first receiving end, wherein the values of the filtering parameters are adjusted according to the noise statistic related value, and the adjusted values of the filtering parameters are used in filtering the crosstalk source signals.

According to the embodiments of the present invention, coordinated transmitting signals are pre-coded for crosstalk cancellation in an adaptive filtering way, and an adaptive variation of the filtering parameter values is directed properly in view of an influence of crosstalk components in the received signals, the influence being reflected indirectly by the noise statistic related value reported from the receiving end. Theoretical and simulation experiential studies demonstrate good convergence and crosstalk cancellation effects to avoid the difficulty with pre-knowing a channel transmission matrix in the existing fixed filter solution; and also an impact on an existing transmission standard in an xDSL application can be totally avoided because the existing receiving end can report the noise statistic related value of some types already provided in the existing standard over an Embedded Operations Channel (EOC).

The present invention is further described in detail below by way of the embodiments with reference to the drawings.

DETAILED DESCRIPTION OF THE INVENTION

Figure 1:
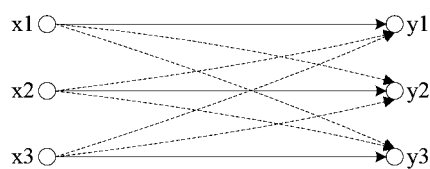
FIG. 1 illustrates a schematic diagram of a far-end crosstalk in the conventional art.
Figure 2:
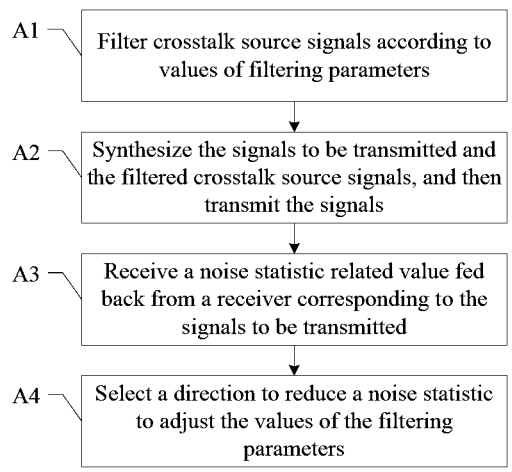
FIG. 2 schematically illustrates a general flow chart of a far-end crosstalk canceling method according to an embodiment of the present invention.

An embodiment of the present invention provides a far-end crosstalk canceling method, in which coordinated transmitting signals for crosstalk cancellation are pre-coded in an adaptive filtering way, and values of adaptive filtering parameters are adjusted according to a noise statistic related value that is fed back from a receiving end. The method includes general steps as illustrated in FIG. 2.

A1. Crosstalk source signals for signals to be transmitted are filtered according to values of filtering parameters.

It shall be noted that the crosstalk source signals for the signals to be transmitted are filtered according to initial values of the filtering parameters in the first filtering process, and may be filtered according to adjusted values of the filtering parameters in the subsequent filtering process.

The filtering process may be performed in the frequency domain to filter components of the crosstalk source signals over respective sub-carriers, or may be performed in the time domain to perform overall time-domain filtering, with the multi-carrier modulated signals treated as general signals. The initial values of the filtering parameter may be designated values, e.g., zero, or may be generated randomly.

A2. The signals to be transmitted and the filtered crosstalk source signals are synthesized and then transmitted.

In this step, the filtered crosstalk source signals are integrated into the signals to be transmitted by additive or subtractive synthesis. In the case of time-domain filtering, the signals to be transmitted and the filtered crosstalk source signals may undergo time-domain synthesizing. In the case of frequency-domain filtering, the components of the signals to be transmitted and the filtered crosstalk source signals over the sub-carriers may be synthesized respectively.

A3. Noise statistic related values fed back from a receiving end that corresponds to the signals to be transmitted are received.

The noise statistic related values as referred to in this text mean broadly, and any statistic value which can reflect noise components in the received signals can be used as a noise statistic related value. For example, the noise statistic related value may include a numerical value of the noise statistic, a difference between two adjacent noise statistics, a sign of the difference between two adjacent noise statistics, etc. The noise statistic related value and the noise statistic may be in a positive or negative correlation. In an xDSL application, a parameter of signal-to-noise ratio of the received signals may be selected as a noise statistic related value. The higher the signal-to-noise ratio is, the lower the noise is. Because the existing transmission standard can directly provide a parameter signal-to-noise ratio for each sub-carrier, the feedback can be obtained without modifying the existing transmission standard. Furthermore, if only a sign of a difference is used as the feedback, only one bit (with two states respectively indicating increment, no change or decrement of the noise statistic) or two bits (with three states respectively indicating increment, no change or decrement of the noise statistic) may be used for the feedback, which can reduce the amount of feedback data greatly and reduce requirements on an Embedded Operations Channel (EOC).

A4. The values of the filtering parameters are adjusted according to the noise statistic related values, as the noise statistic reduces.

Among factors influencing the noise statistic, noise components except the crosstalk component, e.g., the space-related noise and the environmental noise are independent of the values of the filtering parameters and may be regarded as an expected response. Therefore, a variation of the noise statistic with the values of the filtering parameters can reflect indirectly a variation of the crosstalk component in the received signals with the values of the filtering parameters, and accordingly it is effective to cancel the crosstalk by adjusting the values of the filtering parameters according to the variation of the noise statistic. Moreover, a theoretical research on a relationship between a noise statistic and parameters of an adaptive filter shows that the noise statistic is a quadratic function of values of the filtering parameters. Therefore, a convergence result may be obtained by adjusting the values of the filtering parameters as the noise statistic reduces.

Embodiments of the present invention further provide a far-end crosstalk canceling device, a signal transmitting device and a signal processing system. Various recommended time-domain and frequency-domain filtering models and methods for adjusting values of filtering parameters are described as below by way of the method embodiments, and the embodiments of the device and system according to the present invention are described in detail.

Figure 3:
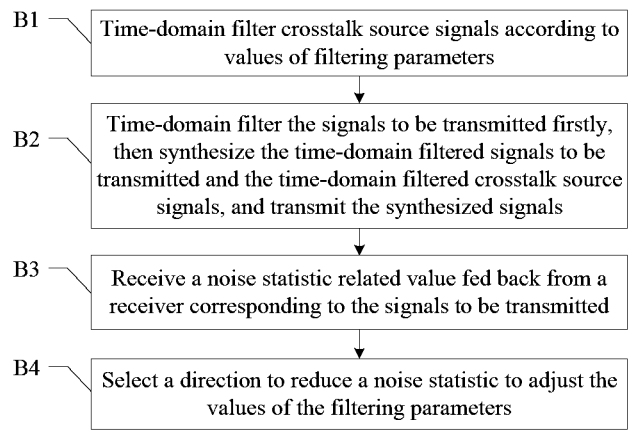
FIG. 3 schematically illustrates a flow chart of a far-end crosstalk canceling method according to a first embodiment of the present invention.

The first embodiment provides a far-end crosstalk canceling method, an implementation flow chart of which is illustrated in FIG. 3. Time-domain adaptive filtering is adopted in the method according to this embodiment, and the method includes the following steps.

B1. Crosstalk source signals for signals to be transmitted are time-domain filtered according to values of filtering parameters, as illustrated in FIG. 4.

Figure 4:
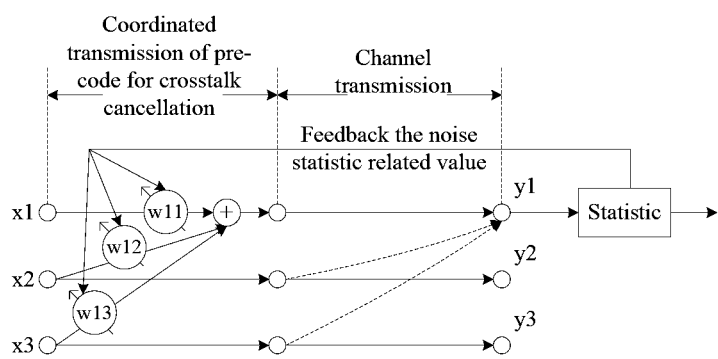
FIG. 4 illustrates a schematic diagram of signal processing according to the first embodiment of the present invention.

In FIG. 4, a branch of signals x1 serves as signals to be transmitted, and only branches of signals x2 and x3 are shown as crosstalk to the branch of signals x1. Only filters w12 and w13 for time-domain filtering the branches of signals x2 and x3 are depicted to reflect filtering of crosstalk sources (this also applies to the embodiments below). Apparently, this signal processing model may be extended to respective branches of signals. For example, in this embodiment, filters w21 and w23 (not shown) may be added for filtering the branches of signals x1 and x3 which are used as crosstalk sources for the branch of signals x2. In this case, a feedback required by the filters w21 and w23 is a statistic from the end y2.

B2. The signals to be transmitted are firstly time-domain filtered, then synthesized with the time-domain filtered crosstalk source signals, and the resultant synthesized signals are transmitted.

In order to enhance adjustability of lines, such as to change a gain of the signals to be transmitted, in this embodiment the signals to be transmitted are firstly time-domain filtered by the filter w11 before being synthesized with the branches of time-domain filtered crosstalk source signals. This filter also receives a feedback from the end y1.

B3. Noise statistic related values fed back from a receiving end that corresponds to the signals to be transmitted are received.

The end y1 performs a reception processing on receiving the signals and then feeds back the noise statistic related values obtained by taking a statistic, typically via an EOC channel in the xDSL.

B4. The values of the filtering parameters are adjusted according to the noise statistic related values, as the noise statistic reduces.

In this embodiment, the values of the filtering parameters to be adjusted are values of filtering parameters of the adaptive time-domain filters w11, w12 and w13. As apparent from the quadratic function relationship between the values of the filtering parameters and the noise statistic, there exists a filtering parameter minimizing the noise statistic, and the filtering parameter may be regarded as a target value which is optimal to cancel a crosstalk. Therefore, the target values of the filtering parameters can be calculated by various mathematic operation means. Several preferred parameter adjusting methods are given below in connection with practical applications. Methods for adjusting values of filtering parameters are described below, and these descriptions will not be limited to any filter or any kind of filters but will be applicable to any filter, provided that its filtering parameters can be adjusted as the noise statistic reduces.

The first adjusting method is a gradient estimation decision iterative solution.

This solution is primarily based upon the quadratic function relationship between the values of the filtering parameters and the noise statistic. In a multi-dimension space consisting of several sets of filtering parameter values to be adjusted, the noise statistic is like a "hyper-bowl", and the values of the filtering parameters are adjusted for the purpose of reaching the bottom of the "hyper-bowl." With the assumption of a start from any point on the "hyper-bowl", several gradient vectors are selected as estimates of the next step, to make respective attempts and determine feedbacks of the attempts, so that a gradient vector with the closest approximation to the direction to the bowl bottom can be selected from these estimates. Then the process is repeated step by step, and a result of convergence at the bowl bottom can be obtained only if an accuracy of the selection is above 50%. Steps of this method are described in detail below.

1.1 The value of a current filtering parameter is iterated respectively with several gradient vectors. The following formula may be used for iteration to improve the accuracy of gradient vector estimation.

$$w(n+1)=w(n)+\lambda \times \text{sign}[e(n)] \times u(n)$$

where $w(n+1)$ and $w(n)$ respectively denote the values of filtering parameter after and before the $(n+1)^{th}$ iteration, $\lambda$ denotes a selected step, $\text{sign}[e(n)]$ denotes a sign of an estimated noise error, and $u(n)$ denotes an input signal being filtered using $w(n)$. The $\text{sign}[e(n)] \times u(n)$ denotes a gradient vector, which depends on $\text{sign}[e(n)]$. The $u(n)$ may be in different forms of data depending on different types of adaptive filters. For example, $u(n)$ denotes a matrix of L rows and M columns if a block Least Mean Square (LMS) filter with an order M and a length L is used, or denotes an M-dimension vector if a general LMS filter with an order M is used.

It shall be noted that the above iterative formula provides a large number of candidate iterative values as values of filtering parameters that can be used for attempts. For example, if the input $u(n)$ is a data block with a length L, $2^L$ candidate iterative values may be generated because of two signs + and − of $\text{sign}[e(n)]$. It is possible in practical application to select only part of all the possible scenarios as candidate iterative values to improve a search speed.

1.2 The gradient vector that minimizes the noise statistic is decided from the noise statistic related value corresponding to the iterated sets of filtering parameter values fed back from the receiving end.

Ideally, the gradient vector decided from the fed-back noise statistic related value is generally correct, but a decision error may arise due to an additional influence of statistic non-stationarity, which may possibly occur with the noise in practice. However, an accuracy of the decision over 50% is sufficient to eventually obtain a convergence result regardless of a possible devious route passing at a "hyper-bowl" surface. The accuracy may be improved by increasing the step appropriately in an adaptive filter principle.

1.3 The values of the filtering parameters iterated with the decided gradient vector are used as the current values of the filtering parameters.

1.4 The above iterative process is repeated until the values of the filtering parameters converge.

The above adjusting method adjusts the filtering parameters under the same feedback control in a multi-value estimation and feedback decision way. Another method for adjusting values of filtering parameters according to a feedback is further given below.

The second method is an optimal value search solution.

This solution is primarily based upon that: a noise statistic appears as a simple quadratic curve for a set of filtering parameters, an optimal value of the set of filtering parameters corresponding to a minimum value of the curve can be searched conveniently with the assumption that other sets of filtering parameters keep constant, and a convergence result can be obtained if the optimal value search process is repeated respectively for each set of filtering parameters. Steps of this method are described in detail as below.

2.1 Values of other sets of filtering parameters except one set of filtering parameters to be adjusted are fixed.

2.2 Update values of the filtering parameters to be adjusted to reduce the noise statistic are searched according to the noise statistic related values fed back from the receiving end. The update values are approximation to the optimal value in the practical search, and two methods for searching for update values are presented below.

2.2.1 A method with a varying step in a single search process includes the steps as follows.

2.2.1.1 Variations of the noise statistic reflected by the noise statistic related values fed back from the receiving end are compared with each other in the case that the values of the filtering parameters to be adjusted are respectively $w+\lambda$, $w$, and $w-\lambda$; where $w$ denotes the values of the filtering parameters to be adjusted before adjusting, and $\lambda$ denotes a selected step.

2.2.1.2 If the values corresponding to the minimum noise statistic are $w$, the step $\lambda$ is reduced, typically to a half of the previous step, for further comparison until the values corresponding to the minimum noise statistic are other than $w$, and these values corresponding to the minimum noise statistic are used as update values of the filtering parameters to be adjusted.

2.2.2 A method with a fixed step in a search process requires that the fed-back noise statistic related value is a numerical value of the noise statistic and includes the steps as follows.

2.2.2.1 A directive search for the values of the filtering parameters to be adjusted is made with a selected step $\lambda$, and the search direction is changed in the case of an incremental variation of a numerical value of the noise statistic.

2.2.2.2 The last three search values of the filtering parameters to be adjusted are recorded if a decremented variation of the numerical value of the noise statistic changes to an incremental variation of the noise statistic between two adjacent search processes.

2.2.2.3 A curve illustrating the functional relationship between the values of the filtering parameters to be adjusted and the numerical value of the noise statistic is fitted according to the last three search values of the filtering parameters to be adjusted and the numerical value of the noise statistic corresponding to the last three search values, and the filtering parameter values corresponding to the minimum noise statistic are estimated as update values of the filtering parameters to be adjusted according to the fitted curve. Various fitting method may be adopted because there are three pairs of function values. For example, quadratic curve fitting may be adopted, in which the lowest point of the fitted curve may be used as an estimate of the update values. Calculations in this method may be difficult in the case that the filtering parameters are multi-order vectors. Therefore, the following linear fitting formula is recommended to calculate the update values in view of the accuracy and speed of calculations.

$$\hat{w} = \left( \frac{(e_{mid} - e_{min}) \times (w_{max} - w_{min})}{e_{max} - e_{min}} + w_{min} + w_{mid} \right) / 2$$

where $\hat{w}$ denotes the update values of the filtering parameters to be adjusted resulting from fitting, $w_{max}$, $w_{mid}$ and $w_{min}$, respectively denote the filtering parameter values corresponding to the maximum, median and minimum numerical value of the noise statistic in the last three search values of the filtering parameters to be adjusted, and $e_{max}$, $e_{mid}$ and $e_{min}$, respectively denote the numerical value of the noise statistic corresponding to $w_{max}$, $w_{mid}$ and $w_{min}$.

2.3 The searched update values are used as the current values of the filtering parameters to be adjusted, and the above process proceeds to search for update values of each remaining set of filtering parameters.

2.4 The above cyclic search processes are repeated until each set of values of filtering parameters converges. If the method with a fixed step in 2.2.2 is adopted in the step 2.2, the step λ is shortened to typically 1/1.5 of the original step in order to search for the values of the filtering parameters to be adjusted in the next cyclic search process.

Figure 5:
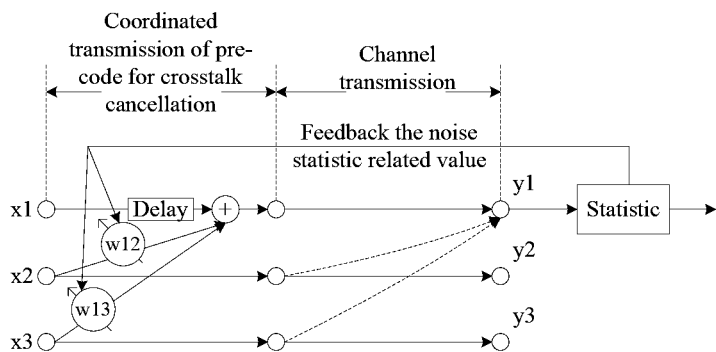
FIG. 5 illustrates a schematic diagram of signal processing according to a second embodiment of the present invention.

A second embodiment provides another far-end crosstalk canceling method, and an implementation flow of the method according to this embodiment is substantially the same as that of the method described in the first embodiment except that in this embodiment the signals to be transmitted are firstly filtered with a delay before synthesis of the signals to be transmitted with the time-domain filtered crosstalk source signals. FIG. 5 illustrates a schematic diagram of signal processing.

FIG. 5 is different from FIG. 4 in that the adaptive filter w11 in FIG. 4 is replaced with a delay filter. The delay filter may be regarded as one kind of time-domain filters. The delay filter is arranged to integrate the signals to be transmitted into the filtered crosstalk source signals at an appropriate time, so that pre-coding of the signals can cancel properly the far-end crosstalk caused at that time by the crosstalk sources when the signals arrives at the receiving end. A delay amount mainly depends upon a specific operating environment of lines and the number of orders of the adaptive filter in use. Therefore, it is unnecessary to adjust the delay filter according to a feedback from the end y1. This method is advantageous due to simplified processing when a user becomes active and inactive. When a new user line is added, for example, if a user line x1 becomes active while assuming previous presence of only user lines x2 and x3, only w12 and w13 need to be updated without any influence on other filters associated with the user lines x2 and x3. When a user exits, for example, if the user line x1 exits, only w12 and w13 need to be disabled without any influence on the other users.

Reference can be made to the methods provided in the first embodiment for specific adjustment of filtering parameter values of the remaining adaptive time-domain filters.

Figure 6:
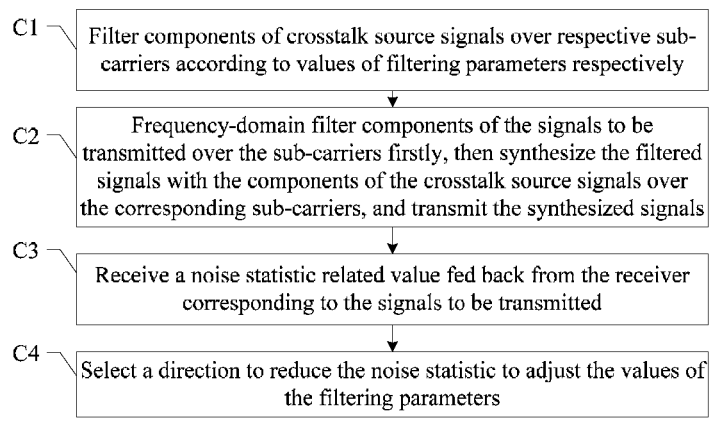
FIG. 6 schematically illustrates a flow chart of a far-end crosstalk canceling method according to a third embodiment of the present invention.

A third embodiment provides another far-end crosstalk canceling method, an implementation flow of which is as illustrated in FIG. 6. The method of this embodiment adopts adaptive frequency-domain filtering and includes the steps as follows.

C1. Crosstalk source signals for signals to be transmitted undergo frequency-domain filtering according to values of filtering parameters, i.e., components of the crosstalk source signals over respective sub-carriers are filtered respectively.

Frequency-domain filtering is equivalent to multiplication of the components of the signals over the sub-carriers by complex coefficients, and the complex coefficients each have a modulus indicating a gain over a frequency band and a phase angle indicating a leading or lag phrase response over the frequency band.

Figure 7:
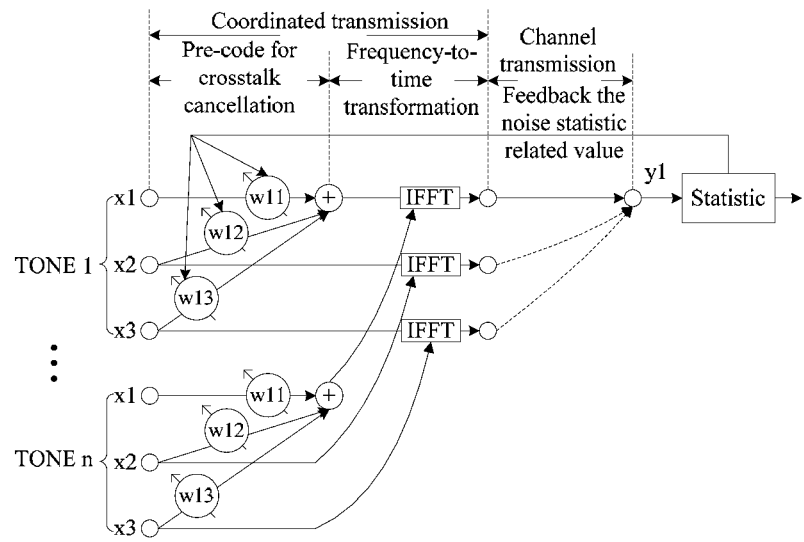
FIG. 7 illustrates a schematic diagram of signal processing according to the third embodiment of the present invention.

FIG. 7 illustrates a schematic diagram of signal processing. In FIG. 7, a signal to be transmitted x1 and crosstalk source signals x2 and x3 can be regarded in the frequency domain as being borne respectively over a number n of sub-carriers TONE 1 to TONE n. The crosstalk sources are filtered according to the frequency-domain filters w12 and w13 over each frequency band. The w12 and w13 may possibly denote different complex coefficients for different frequency bands, and "wij" is used throughout the context to denote cancellation filtering of a crosstalk of the $j^{th}$ crosstalk source to the $i^{th}$ branch of signals.

C2. Components of the signals to be transmitted over the sub-carriers undergo firstly frequency-domain filtering, then are synthesized with the components of the crosstalk source signals over the corresponding sub-carriers and then transmitted.

In order to improve the performance of lines, in this embodiment the frequency-domain components of the signals to be transmitted are firstly filtered by the frequency-domain filter w11 before synthesis of the frequency-domain components of the signals to be transmitted with the frequency-domain components of the filtered crosstalk source signals. Indeed, the filter may receive a feedback from the end y1.

For such multi-carrier modulated signals, the carries of the signals are typically modulated into a branch of time-domain signals by Inverse Fast Fourier Transformation (IFFT) for transmission. Therefore, the synthesized frequency-domain components shall be frequency-to-time transformed before transmission.

C3. A noise statistic related value fed back from the receiving end corresponding to the signals to be transmitted is received.

The noise statistic related value shall be fed back to each of the filters of the sub-carriers, including filters of the crosstalk source and filters of the signals to be transmitted. Particularly, if the noise statistic related value includes components corresponding to the respective frequency bands, e.g., signal-to-noise ratios of the sub-carriers, the components of the noise statistic related value corresponding to the frequency band may be fed back correspondingly to the filters of the frequency bands. FIG. 7 depicts only a feedback to the filter for TONE 1 for simplicity, but this may apply to the other frequency bands.

C4. A direction to reduce the noise statistic is selected according to the noise statistic related value, and the values of the filtering parameters are adjusted according to the selection result.

In this embodiment, the filtering parameter values to be adjusted are the filtering parameter values of the adaptive frequency-domain filters w11, w12 and w13 over the sub-carriers. In the case that the feedback noise statistic related value includes the components corresponding to the sub-carriers, the values of the filtering parameters may be adjusted taking only the components of the feedback noise statistic related value of the corresponding sub-carriers into account. Reference can be made to the methods provided in the first embodiment for specific adjusting of the filtering parameter values, except that variables in the calculation formula are replaced with those corresponding to the frequency domain.

Figure 8:
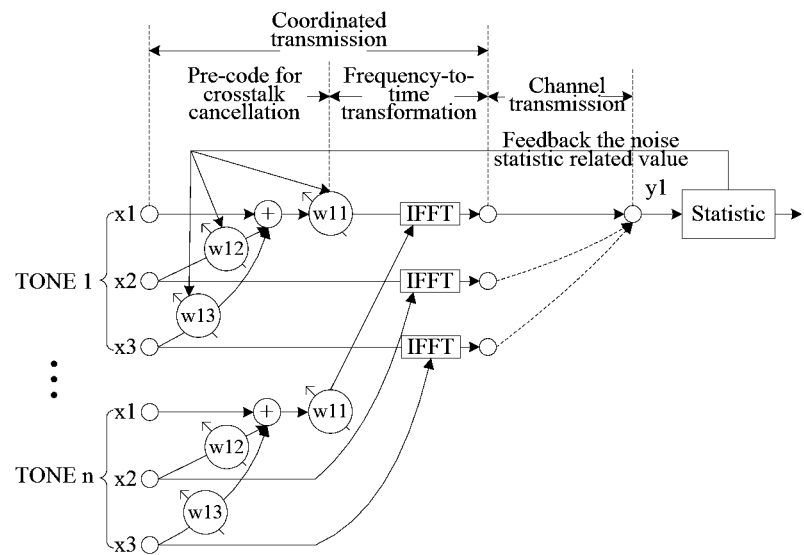
FIG. 8 illustrates a schematic diagram of signal processing according to a fourth embodiment of the present invention.

A fourth embodiment provides another far-end crosstalk canceling method, and a flow of the method according to this embodiment is substantially the same as that in the third embodiment except that in this embodiment the components of the signals to be transmitted over the sub-carriers respectively are synthesized with the components of the crosstalk source signals undergoing frequency-domain filtering over the corresponding sub-carriers, and then the synthesized signals undergo frequency-domain filtering, instead of performing frequency-domain filtering on the components of the signals to be transmitted over the sub-carriers before synthesis of the components. FIG. 8 illustrates a schematic diagram of signal processing according to this embodiment of the method.

FIG. 8 is different from FIG. 7 in that the filter w11 in FIG. 7 over the line x1 before synthesis is changed to a line after synthesis. This method is advantageous in that if a new user line is added, for example, if a user line x3 is added while assuming previous presence of only user lines x1 and x2, only w13 and w11 need to be updated without need of updating any other filters. If a user quits, for example, if the user line x3 quits, w13 is disabled and only w11 needs to be updated. This method can facilitate getting active or inactive of a user and reduce as much as possible the influence on other users in the case of a large number of users.

Embodiments of the device and system according to the present invention are described in detail as below.

Figure 9:
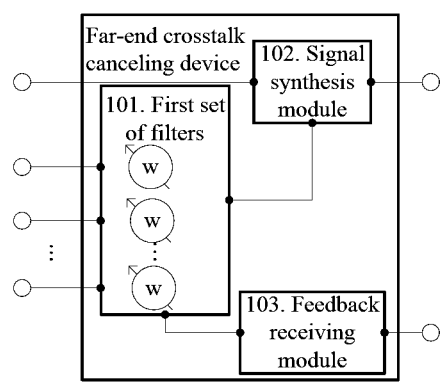
FIG. 9 illustrates a schematic diagram of a structure of a far-end crosstalk canceling device according to a fifth embodiment of the present invention.

A fifth embodiment provides a far-end crosstalk canceling device with a structure as illustrated schematically in FIG. 9. The far-end crosstalk canceling device includes a first set of filters 101, a signal synthesis module 102, and a feedback receiving module 103.

The first set of filters 101 includes several adaptive filters w, configured to filter crosstalk source signals of signals to be transmitted, select a direction to reduce a noise statistic according to a noise statistic related value received by the feedback receiving module 103, and adjust parameters of the adaptive filters w.

The signal synthesis module 102 is configured to synthesize the signals to be transmitted with the crosstalk source signals filtered by the first set of filters 101.

The feedback receiving module 103 is configured to receive the noise statistic related value fed back from a receiving end corresponding to the signals to be transmitted.

The crosstalk canceling device of this embodiment may be configured in an xDSL DSLAM to pre-code coordinated transmitting signals from the xDSL DSLAM for crosstalk cancellation.

Preferably, the crosstalk canceling device may further include a second adaptive time-domain filter, configured to time-domain filter the signals to be transmitted before the signals to be transmitted enter the signal synthesis module, and select the direction to reduce the noise statistic according to the noise statistic related value received by the feedback receiving module to adjust values of the filtering parameters.

Figure 10:
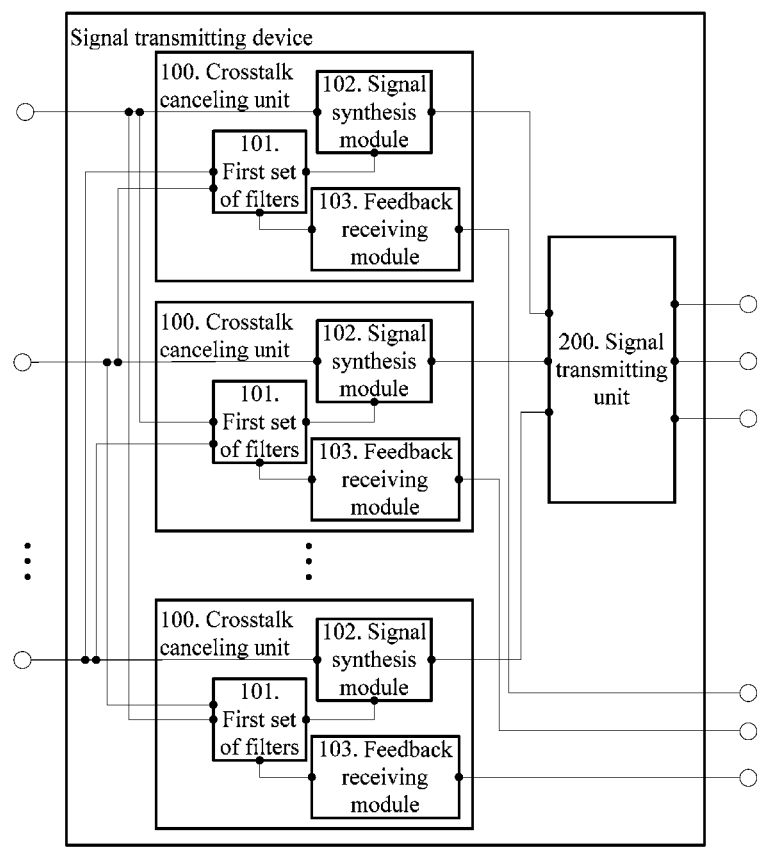
FIG. 10 illustrates a schematic diagram of a structure of a signal transmission device according to a sixth embodiment of the present invention.

A sixth embodiment provides a signal transmitting device with a structure as illustrated schematically in FIG. 10. The signal transmitting device includes a crosstalk canceling unit 100 integrated in the signal transmitting device and a signal transmitting unit 200.

In particular, the signal transmitting device of this embodiment may include several crosstalk canceling units 100 configured to pre-code several branches of signals to be transmitted for crosstalk cancellation, and the crosstalk canceling units 100 each may be structured as the crosstalk canceling device in the fifth embodiment, and reference can be made to the above description for details without being repeated here. In the device of this embodiment, a branch of input signals may be signals to be transmitted for a crosstalk canceling unit. However, the branch of input signals may be crosstalk source signals input for other crosstalk canceling units.

The signal transmitting unit 200 is configured to transmit the signals synthesized by the signal synthesis modules 102 of the crosstalk canceling unit 100 to the receiving end.

Figure 11:
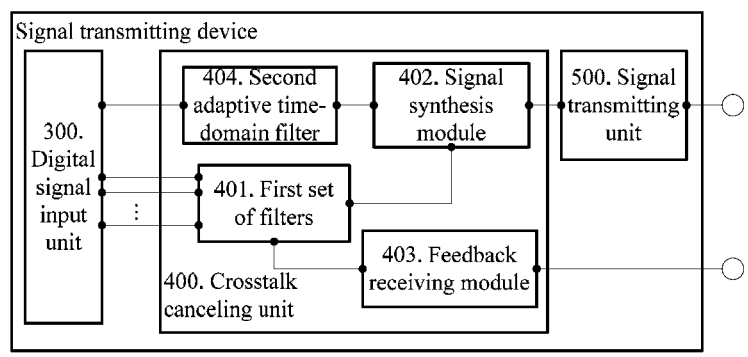
FIG. 11 illustrates a schematic diagram of a structure of a signal transmission device according to a seventh embodiment of the present invention.

A seventh embodiment provides another signal transmitting device with a structure as illustrated schematically in FIG. 11. The signal transmitting device includes a digital signal input unit 300, a crosstalk canceling unit 400, and a signal transmitting unit 500.

The digital signal input unit 300 is configured to output signals to be transmitted and crosstalk source signals of the signals to be transmitted.

The crosstalk canceling unit 400 includes a first set of filters 401, a signal synthesis module 402, a feedback receiving unit 403 and a second adaptive time-domain filter 404.

The first set of filters 401 includes several adaptive time-domain filters configured to time-domain filter the crosstalk source signals of the signals to be transmitted output from the digital signal input unit 300 respectively, select a direction to reduce a noise statistic according to a noise statistic related value received by the feedback receiving module 403, and adjust the values of filtering parameters.

The signal synthesis module 402 is configured to synthesize the transmitting signals with the crosstalk source signals undergoing time-domain filtering by the first set of filters 401.

The feedback receiving module 403 is configured to receive the noise statistic related value fed back from a receiving end corresponding to the signals to be transmitted.

The second adaptive time-domain filter 404 is configured to perform time-domain filtering on the signals to be transmitted before the signals to be transmitted enter the signal synthesis module 402, and select the direction to reduce the noise statistic according to the noise statistic related value received by the feedback receiving module 403 to adjust the values of the filtering parameters.

The signal transmitting unit 500 is configured to transmit the signals synthesized by the signal synthesis module 402 to the receiving end.

For clarity, FIG. 11 in this embodiment illustrates a schematic diagram of a signal transmitting device including the digital signal input unit 300, the crosstalk canceling unit 400 and the signal transmitting unit 500. Apparently, just like the sixth embodiment, crosstalk canceling units may be arranged for respective branches of input signals in the crosstalk canceling device of this embodiment.

Functions and operations of the respective units, modules and filters in the signal transmitting device of this embodiment may be implemented as in the corresponding steps of the far-end crosstalk canceling method in the first embodiment and the corresponding descriptions are not repeated here.

Figure 12:
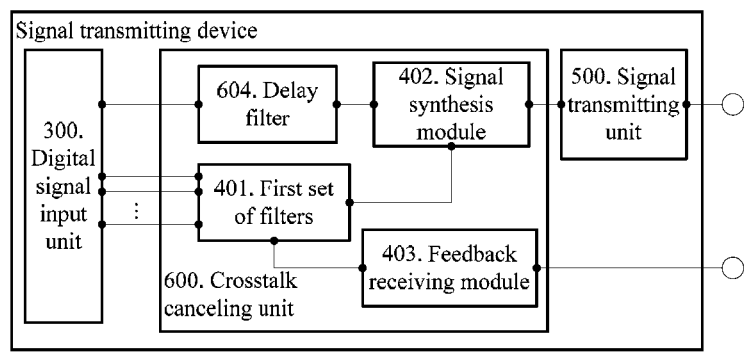
FIG. 12 illustrates a schematic diagram of a structure of a signal transmission device according to an eighth embodiment of the present invention.

An eighth embodiment provides another signal transmitting device as illustrated in FIG. 12. The signal transmitting device includes a digital signal input unit 300, a crosstalk canceling unit 600, and a signal transmitting unit 500.

The signal transmitting device of this embodiment is structured substantially the same as that in the seventh embodiment except that a delay filter 604 in the crosstalk canceling unit 600 of this embodiment replaces the second adaptive time-domain filter 404 of the crosstalk canceling unit 400 in the seventh embodiment. The delay filter 604 is configured to delay the signals to be transmitted before the signals to be transmitted enter the signal synthesis module 402, so that it is unnecessary to obtain any feedback signal received by the feedback receiving module 403.

Functions and operations of the respective units, modules and filters in the signal transmission device of this embodiment may be implemented as in the corresponding steps of the far-end crosstalk canceling method in the second embodiment and the corresponding descriptions are not repeated here.

Figure 13:
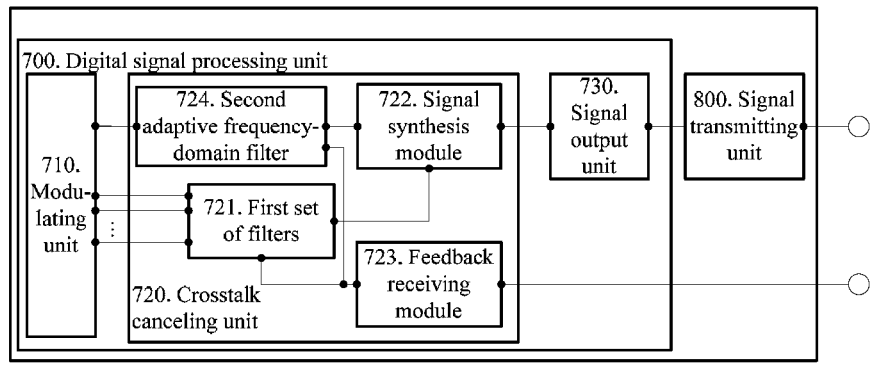
FIG. 13 illustrates a schematic diagram of a structure of a signal transmission device according to a ninth embodiment of the present invention.

A ninth embodiment provides another signal transmitting device as illustrated in FIG. 13. The signal transmitting device includes a digital signal processing unit 700 and a signal transmitting unit 800.

The digital signal processing unit 700 includes a modulating unit 710, a crosstalk canceling unit 720 and a signal output unit 730.

The modulating unit 710 is configured to modulate components of signals to be transmitted and crosstalk source signals of the signals to be transmitted over respective sub-carriers.

The crosstalk canceling sub-unit 720 includes a first set of filters 721, a signal synthesis module 722, a feedback receiving unit 723 and a second adaptive frequency-domain filter 724.

The first set of filters 721 includes several adaptive frequency-domain filters configured to frequency-domain filter the components of the crosstalk source signals of the signals to be transmitted output from the modulating unit 710 over respective sub-carriers, and select a direction to reduce a noise statistic according to a noise statistic related value received by the feedback receiving module 723 to adjust the values of filtering parameters.

The signal synthesis module 722 is configured to synthesize components of the signals to be transmitted over respective sub-carriers respectively with the components of the crosstalk source signals, which undergo frequency-domain filtering by the first set of filters 712, over the corresponding sub-carriers.

The feedback receiving module 723 is configured to receive the noise statistic related value fed back from a receiving end corresponding to the signals to be transmitted.

The second adaptive frequency-domain filter 724 is configured to perform frequency-domain filtering on the components of the signals to be transmitted over the sub-carriers before the components of the signals to be transmitted over the sub-carriers enter the signal synthesis module 722, and select a direction to reduce the noise statistic according to the noise statistic related value received by the feedback receiving module 723 to adjust the values of the filtering parameters.

The signal output unit 730 is configured to perform Inverse Fast Fourier Transformation on the components over the sub-carriers synthesized by the signal synthesis module 722 and to output time-domain signals.

The signal transmitting unit 800 is configured to transmit the time-domain signals output from the signal output unit 730 to the receiving end.

Functions and operations of the respective units, modules and filters in the signal transmitting device of this embodiment may be implemented as in the corresponding steps of the far-end crosstalk canceling method in the third embodiment and the corresponding descriptions are not repeated here.

Figure 14:
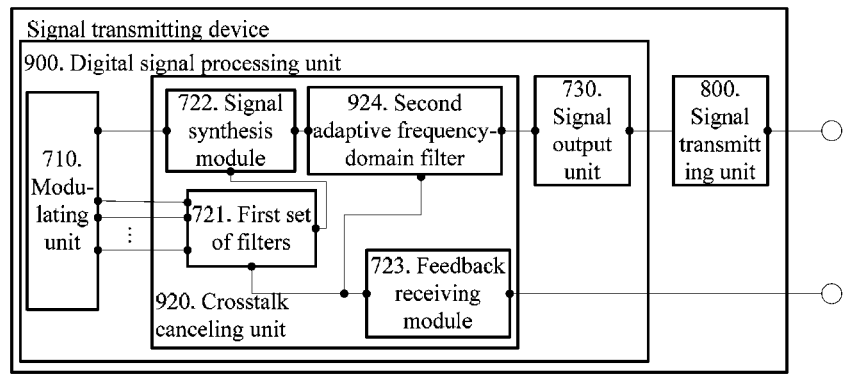
FIG. 14 illustrates a schematic diagram of a structure of a signal transmission device according to a tenth embodiment of the present invention.

A tenth embodiment provides another signal transmitting device structured as illustrated schematically in FIG. 14. The signal transmitting device includes a modulating unit 710, a crosstalk canceling unit 920 and a signal output unit 730 integrated in a digital signal processing unit 900, and a signal transmitting unit 800.

The signal transmitting device of this embodiment is structured substantially the same as in the ninth embodiment except that the second adaptive frequency-domain filter in this embodiment filters the frequency-domain components of the signals after synthesis of the frequency-domain components instead of before the synthesis of the frequency-domain components. In this embodiment, the second adaptive frequency-domain filter 924 in the crosstalk canceling unit 920 of the digital signal processing unit 900 is arranged between the signal synthesis module 722 and the signal output unit 730, and is configured to perform frequency-domain filtering on the signals undergoing frequency-domain synthesizing output from the signal synthesis module 722, and then output them to the signal output sub-unit 730. Indeed, the second adaptive frequency-domain filter 924 may also obtain a feedback signal received by the feedback receiving unit 723 and adjust adaptively the values of the filtering parameters.

Functions and operations of the respective units, modules and filters in the signal transmission device of this embodiment may be implemented as in the corresponding steps of the far-end crosstalk cancellation method in the fourth embodiment and the corresponding descriptions are not repeated here.

Figure 15:
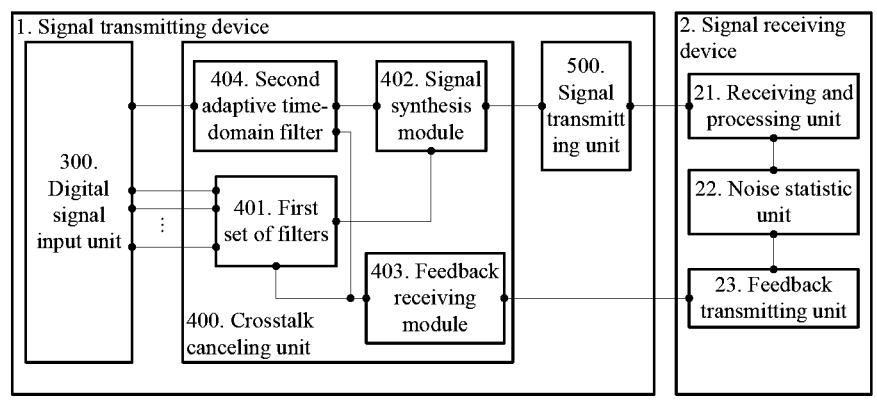
FIG. 15 illustrates a schematic diagram of a signal processing system according to an eleventh embodiment of the present invention.

An eleventh embodiment provides a signal processing system structured as illustrated schematically in FIG. 15. The signal processing system includes a signal transmitting device 1 and a signal receiving device 2.

The signal transmitting device 1 may be structured particularly as in the sixth to tenth embodiments, and the structure of the signal transmitting device in the seventh embodiment is adopted in FIG. 15 of this embodiment for clarity.

The signal receiving device 2 includes a receiving and processing unit 21, a noise statistic unit 22 and a feedback transmitting unit 23.

The receiving and processing unit 21 is configured to receive the signals transmitted from the signal transmitting device 1.

The noise statistic unit 22 is configured to make a noise statistic of the signals received by the receiving and processing unit 21 and generate the noise statistic related value.

The feedback transmitting unit 23 is configured to transmit the noise statistic related value generated by the noise statistic unit 22 to the signal transmitting device 1 over a feedback channel.

It shall be noted that the functions and operations of the far-end crosstalk canceling device are the same as those of the respective devices or modules in the crosstalk canceling unit.

The far-end crosstalk canceling method and the corresponding far-end crosstalk canceling device, signal transmitting device and signal processing system according to the present invention have been described in detail as above, the principle and embodiments of the present invention have been set forth in the context by way of specific examples, and the above descriptions of the embodiments are provided merely to facilitate understanding of the inventive method the essential idea thereof. Those ordinarily skilled in the art can modify the embodiments and application scopes without departing from the scope of the present invention. Accordingly, the discourse of the specification shall not be taken in any way to limit the scope of the present invention as defined in the appended claims.

What is claimed is:

1. A method for reducing far-end crosstalk in a digital line system, wherein the system comprises a first line and second lines, the method comprises:
   receiving a noise related value fed back from a first receiving end to a first transmitting end over the first line;

pre-coding, a first signal and crosstalk source signals according to values of filtering parameters to form a synthesized signal corresponding to the first line; wherein the crosstalk source signals are related to second signals over the second lines, and the values of the filtering parameters are acquired according to the noise related value; wherein the first signal is to be transmitted over the first line from the first transmitting end to the first receiving end, and the second signals are to be transmitted from a second transmitting end to a second receiving end over each of the second lines; and transmitting the synthesized signal from the first transmitting end to the first receiving end over the first line.

2. The method according to claim 1, wherein the noise related value reflects a noise component of signal received at the first receiving end.

3. The method according to claim 1, wherein the pre-coding the first signal and the crosstalk source signals according to the values of the filtering parameters to form the synthesized signal comprises:

filtering frequency-domain components of the crosstalk source signals and the first signal per sub-carrier in a frequency domain according to the values of the filtering parameters;

synthesizing frequency-domain components of the filtered first signal with frequency-domain components of the filtered crosstalk source signals per sub-carrier in the frequency domain to form the synthesized signal.

4. The method according to claim 1, wherein the filtering parameters are adjusted by performing the following steps until the values of the filtering parameters converge:

iterating current values of the filtering parameters respectively with a plurality of gradient vectors;

determining a gradient vector that maximizes a signal-to-noise ratio according to the noise related value corresponding to the iterated sets of the filtering parameters fed back from the first receiving end; and using the iterated values of the filtering parameters iterated with the gradient vector as updated current values of the filtering parameters;

wherein the first signal and the crosstalk source signals are pre-coded with the values of the filtering parameters in each iteration.

5. The method according to claim 4 wherein the current values of the filtering parameters are iterated with the gradient vectors in the following formula:

$$w(n+1)=w(n)+\lambda \times \text{sign}[e(n)] \times u(n)$$

where w(n+1) and w(n) denote values of the filtering parameters after and before the (n+1)th iteration respectively, $\lambda$ denotes a selected step, sign[e(n)] denotes a sign of an estimated noise error, and u(n) denotes input signals filtered using the values of the filtering parameter w(n).

6. The method according to claim 1, wherein the filtering parameters are adjusted by performing the following steps iteratively until the values of the respective filtering parameters converge:

fixing values of other sets of filtering parameters except one set of filtering parameters to be adjusted;

searching for update values for the set of filtering parameters to be adjusted to reduce the crosstalk according to the noise related value fed back from the first receiving end; and using the update values as updated current values of the set of filtering parameters to be adjusted, and proceeding with searching for updated values of each of the remaining sets of filtering parameters;

wherein the first signal and the crosstalk source signals are pre-coded with the values of the filtering parameters in each iteration.

7. The method according to claim 6 wherein searching for the update values for the set of filtering parameters to be adjusted to reduce the crosstalk increase comprises:

comparing variations of the noise statistic reflected by the noise related value fed back from the first receiving end if values of the set of filtering parameters to be adjusted are w+$\lambda$, w, and w−$\lambda$ respectively, where w denotes values of the set of the filtering parameters to be adjusted before adjusting, and $\lambda$ denotes a selected step; and if the values corresponding to the minimum noise statistic are w, reducing the step $\lambda$ for further comparison until the values corresponding to the minimum noise statistic are other than w, and using the values corresponding to the minimum noise statistic as the updated values of the set of the filtering parameters to be adjusted.

8. A far-end crosstalk canceling device, which is applied in a first transmitting end connected over a first line to a first receiving end, comprising a plurality of adaptive filters, a signal synthesis module, a signal transmitting module and a feedback receiving module, wherein:

each of the plurality of adaptive filters is configured to filter a crosstalk source signal according to a value of a filtering parameter which can be acquired according to a noise related value received by the feedback receiving module, wherein the crosstalk source signals are related to signals to be transmitted over second lines, each of the second lines having a second transmitting end connected to a second receiving end;

the signal synthesis module is configured to synthesize a first signal to be transmitted over the first line with the filtered crosstalk source signals to form a synthesized signal;

the signal transmitting module is configured to transmit the synthesized signal to the first receiving end over the first line; and the feedback receiving module is configured to receive the noise related value fed back from the first receiving end over the first line.

9. The device according to claim 8, wherein the noise related value reflects a noise component of signal received at the first receiving end.

10. The device according to claim 8, further comprising an adaptive time-domain filter connected to the signal synthesis module, configured to perform a time-domain filtering on the first signal, which is received from a digital signal input unit, according to values of time-domain filtering parameters, and send the filtered first signal to the signal synthesis module.

11. The device according to claim 8, further comprising a delay filter connected to the signal synthesis module, configured to delay the first signal and send the delayed first signal to the signal synthesis module.

12. A signal processing system, comprising a first signal transmitting device and a first signal receiving device connected thereto over a first line, wherein:

the first signal transmitting device comprises a plurality of adaptive filters, a signal synthesis module, a signal transmitting module and a feedback receiving module;

each of the plurality of adaptive filters is configured to filter a crosstalk source signal according to a value of a filtering parameter, wherein the crosstalk source signals are related to signals to be transmitted over second lines, each of the second lines having a second transmitting end connected to a second receiving end; and wherein the values of the filtering parameters are acquired according to a noise related value;

the signal synthesis module is configured to synthesize a first signal to be transmitted over the first line with the filtered crosstalk source signals;

the signal transmitting module is configured to transmit synthesized signals to the first receiving end; and the feedback receiving module is configured to receive a noise related value fed back from the first receiving end over the first line, wherein the noise related value reflects a noise component of signal received by the first receiving end.

13. A non-transitory computer readable medium that stores instructions which when executed by one or more processors cause the one or more processors to:

receive a noise related value fed back from a first receiving end to a first transmitting end over a first line, wherein the noise related value reflects a noise component of signal received by the first receiving end;

pre-code a first signal and crosstalk source signals according to values of filtering parameters to form a synthesized signal corresponding to the first line; wherein the crosstalk source signals are related to second signals over the second lines; wherein the first signal is transmitted from the first transmitting end to the first receiving end over the first line, and the second signals are transmitted from second transmitting ends to second receiving ends over the second lines, and wherein the values of filtering parameters are acquired according to the noise related value; and transmit the synthesized signal.

14. A method for reducing far-end crosstalk in a digital line system, wherein the xDSL system comprises a first line and second lines, the method comprising:

receiving a noise statistic related value fed back from a first receiving end to a first transmitting end over the first line;

pre-coding a first signal and crosstalk source signals according to values of filtering parameters, and synthesizing the first signal and the crosstalk source signals; wherein the crosstalk source signals are related to the second signals over the second lines, and the values of the filtering parameters are acquired according to the noise statistic related value; wherein the first signal is to be transmitted over the first line from the first transmitting end to the first receiving end, and the second signals are to be transmitted from a second transmitting end to a second receiving end over each of the second lines; and transmitting the synthesized signals from the first transmitting end to the first receiving end over the first line.

* * * * *